(12) United States Patent
Marley et al.

(10) Patent No.: US 6,799,441 B2
(45) Date of Patent: Oct. 5, 2004

(54) FURNACES FOR FUSED SILICA PRODUCTION

(75) Inventors: Floyd E. Marley, Corning, NY (US); Daniel R. Sempolinski, Painted Post, NY (US); Merrill F. Sproul, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/339,927

(22) Filed: Jan. 10, 2003

(65) Prior Publication Data

US 2003/0136153 A1 Jul. 24, 2003

Related U.S. Application Data

(62) Division of application No. 10/247,917, filed on Sep. 20, 2002, now Pat. No. 6,698,248.
(60) Provisional application No. 60/325,929, filed on Sep. 27, 2001.

(51) Int. Cl.[7] .............................................. C03B 19/09
(52) U.S. Cl. ......................... 65/144; 65/374.13; 373/27
(58) Field of Search ..................... 65/335, 144, 374.13, 65/540, 531, 524; 373/27; 423/335

(56) References Cited

U.S. PATENT DOCUMENTS

| | | | | |
|---|---|---|---|---|
| 3,303,115 A | * | 2/1967 | Nitsche | 205/687 |
| 4,135,901 A | * | 1/1979 | Fujiwara et al. | 65/415 |
| 4,231,774 A | * | 11/1980 | Maklad | 65/413 |
| 4,419,116 A | * | 12/1983 | Nakahara et al. | 65/378 |
| 5,043,002 A | | 8/1991 | Dobbins et al. | |
| 5,152,819 A | | 10/1992 | Blackwell et al. | |
| 5,698,484 A | | 12/1997 | Maxon | |
| 5,702,495 A | | 12/1997 | Hiraiwa et al. | |
| 5,719,698 A | | 2/1998 | Hiraiwa et al. | |
| 5,951,730 A | * | 9/1999 | Schermerhorn | 65/17.3 |
| 5,958,809 A | | 9/1999 | Fujiwara et al. | 501/54 |
| 6,044,664 A | | 4/2000 | Yajima et al. | |
| 6,094,940 A | | 8/2000 | Fujiwara et al. | |
| 6,291,377 B1 | | 9/2001 | Komine et al. | 501/54 |
| 6,574,991 B1 | * | 6/2003 | Pavlik et al. | 65/27 |

* cited by examiner

Primary Examiner—Steven Griffin
Assistant Examiner—Carlos Lopez
(74) Attorney, Agent, or Firm—Timothy M. Schaeberle; James V. Suggs

(57) ABSTRACT

Methods and apparatus for producing fused silica members having high internal transmission are disclosed. The apparatus and methods are capable of producing fused silica having internal transmission of at least 99.65%/cm at 193 nm.

4 Claims, 3 Drawing Sheets

FURNACES FOR FUSED SILICA PRODUCTION

CROSS REFERENCE TO RELATED APPLICATION

This application is a divisional of U.S. application Ser. No. 10/247,917, filed, Sep. 20, 2002, now U.S. Pat. No. 6,698,248, which claims the benefit of Provisional Application Ser. No. 60/325,929, filed Sep. 27, 2001.

FIELD OF THE INVENTION

This invention relates to methods and apparatus for the production of fused silica optical members. More particularly, the invention relates to methods and furnaces for the production of high purity fused silica having high internal transmission.

BACKGROUND OF THE INVENTION

As practiced commercially, fused silica optical members such as lenses, prisms, photomasks and windows, are typically manufactured from bulk pieces of fused silica made in large production furnaces. In overview, silicon-containing gas molecules are reacted in a flame to form silica soot particles. The soot particles are deposited on the hot surface of a rotating or oscillating body where they consolidate to the glassy solid state. In the art, glass making procedures of this type are known as vapor phase hydrolysis/oxidation processes, or simply as flame deposition processes. The bulk fused silica body formed by the deposition of fused silica particles is often referred to as a "boule," and this terminology is used herein with the understanding that the term "boule" includes any silica-containing body formed by a flame hydrolysis process.

FIG. 1 shows a prior art furnace 100 for producing fused silica glass. The furnace includes a crown 12 and a plurality of burners 14 projecting from the crown. As noted above, silica particles are generated in a flame when a silicon containing raw material together with a natural gas are passed through the plurality of burners 14 into the furnace chamber 26. These particles are deposited on a hot collection surface of a rotating body where they consolidate to the solid, glass state. The rotating body is in the form of a refractory cup or containment vessel 15 having lateral walls 17 and a collection surface 21 which surround the boule 19 and provide insulation to the glass as it builds up. The refractory insulation ensures that the cup interior and the crown are kept at high temperatures.

The prior art standard furnace further includes a ring wall 50 which supports the crown 12. The furnace further includes a rotatable base 18 mounted on an oscillation table 20. The base is rotatable about an axis 3. The crown 12, the ring wall 3, the base 18 and the lateral walls are all made from suitable refractory materials.

The cup or containment vessel 15 is formed on the base 18 by means of lateral cup walls or containment walls 17 mounted on the base 18, which forms the cup or containment vessel 15. The lateral cup or containment walls 17 and the portion of the base 18 surrounded by the walls 17 is covered with high purity bait sand 24 which provides collection surface 21 for collecting the initial silica particles produced by the burners 14. During deposition and consolidation of the silica particles into a solid glass, the boule 19 is formed having sidewalls 23 and an upper major surface 25. As the boule 19 is formed during the deposition process, the upper major surface 25 of the boule 19 becomes the collection surface 21a for the silica particles, and as the thickness of the boule 19 increases during the deposition process, the distance z between the burners 24 and the collection surface decreases. The lateral walls 17 can be made from refractory blocks such as alumina base block for forming the walls 17 and an inner liner made of a suitable refractory material such as zircon or zirconia.

Surrounding the lateral walls 17 of the cup or containment vessel 15 is a shadow wall or air inflow wall 30. The shadow wall 30 is mounted on x-y oscillation table 20 by feet 40, for example four feet equally spaced around the circumference of the shadow or air inflow wall 30. Details on the construction a shadow wall and a furnace using a shadow wall may be found in U.S. Pat. No. 5,951,730, the entire contents of which are incorporated herein by reference. Other ways of mounting the air inflow wall to the oscillation table can be used if desired. The stationary ring wall 50 surrounds the ring wall and supports the crown 12. A seal 55 is provided between the stationary ring wall 50 and the air flow wall or shadow wall 30. The seal 55 includes an annular plate 56, which rides in or slides in an annular channel 58 formed within the stationary ring wall 50. The annular channel 58 can include a C-shaped annular metal plate which forms the bottom of the stationary wall, other forms of motion-accommodating seals can be used if desired, including flexible seals composed of flexible metal or refractory cloth, which, for example, can be in the form of bellows.

The products of combustion in a standard prior art furnace 100 are exhausted through ports 60 circumferentially spaced around the furnace. In a typical furnace, six ports 60 are provided, and the ports 60 are located between crown 12 and the top edge 50a of the stationary wall, such that the ports 60 are located above the deposition surface 21 and 21a during formation of the boule.

Boules typically having diameters on the order of five feet (1.5 meters) and thicknesses on the order of 5–10 inches (13–25 cm) can be routinely produced in large production furnaces of the type shown in FIG. 1. Multiple blanks are cut from such boules and used to make the various optical members referred to above. The blanks are generally cut in a direction parallel to the axis of rotation of the boule in the production furnace, and the optical axis of a lens element made from such a blank will also generally be parallel to the boule's axis of rotation in the furnace. For ease of reference, this direction will be referred to as the "axis 1" or "use axis".

As the energy and power output of lasers increase, the optical members such as lenses, prisms, photomasks and windows, which are used in conjunction with such lasers, are exposed to increased irradiation levels and energies. Fused silica members have become widely used as the manufacturing material for optics in such high energy laser systems due to their excellent optical properties and resistance to damage at higher power levels.

The next generation of fused silica glass used in the microlithography market will require ArF (193 nm) internal transmission exceeding 99.65%/cm, and preferably exceeding 99.75%/cm. The standard manufacturing processes described above is capable of consistently producing fused silica lens blanks with 99.5%/cm. Reduction of metal contaminants, which have a major impact on UV transmission, has played a major role in the production of higher transmission fused silica. The effects of metals, such as sodium, potassium and iron, are evident at the 10's of parts per billion level. The standard process has demonstrated the ability to produce fused silica having transmission of 99.65%/cm, without sacrificing glass homogeneity, but not in the quantity needed to make large production quantities of lens blanks and not with the consistency to serve as a basis for a production process. Accordingly, it would be desirable to provide methods and apparatus capable of consistently manufacturing large production quantities of fused silica having internal transmission equal to or greater than 99.65%/cm at 193 nm, and preferably greater than 99.75%/cm.

SUMMARY OF INVENTION

The invention relates to methods and apparatus for producing fused silica. According to one aspect of the invention, a method for producing fused silica is provided which includes the steps of providing a furnace including a plurality of burners disposed above a collection surface and a refractory surface surrounding at least a portion of the collection surface. According to this aspect of the invention, the method further includes collecting soot particles on the collection surface to form a fused silica boule in a generally planar shape having an upper major surface and sidewalls. Still according to this aspect, the method further includes the step of maintaining the temperature of the refractory surface at least 300° C. cooler than the temperature of the deposition surface.

According to another aspect of the invention, the method may further include the step of maintaining an essentially constant distance between the upper major surface of the boule and the burners during formation of the boule. In another aspect of the invention, the collection surface is generally planar and does not include lateral walls in contact with the sidewalls of the boule. According to another aspect, the furnace further includes exhaust ports positioned at the same level or below the collection surface. Still another aspect of the invention relates to maintaining the hydrogen concentration in the fused silica below $3 \times 10^{17}$ molecules/cm³. In another aspect of the invention, the deposition surface temperature is maintained to at least 1800° C. and the crown refractory surface temperature is maintained to at least 1350° C. during the step of collecting the soot particles on the collection surface.

Another aspect of the invention relates to an apparatus, and more particularly, a furnace for manufacturing fused silica boules. According to this aspect, the furnace includes a plurality of burners for depositing fused silica particles and a generally planar collection surface disposed below the burners for collecting the fused silica particles and supporting a boule having an upper major surface and sidewalls during the deposition process. According to this aspect, the collection surface lacks lateral walls in contact with the boule sidewalls.

In another aspect, the furnace further includes means for maintaining a constant distance between the burners and the upper major surface of the boule during formation of the boule. In still another aspect, the furnace further includes vents disposed at the same level or below the collection surface. According to another aspect of the invention, the furnace further refractories surrounding the fused silica boule, and the furnace further includes means for maintaining the temperature of the refractories at least 300° C. cooler than the temperature of the collection surface.

The invention also relates to fused silica members produced in accordance with the method and apparatus of the invention. The methods and apparatus of the present invention are capable of producing fused silica member having an internal transmission of at least 99.75% at 193 nm. In addition, fused silica members can be produced according to the present invention having a refractive index gradient in a direction substantially perpendicular to the use axis of less than 3 parts per million up to a thickness of 100 mm. The fused silica members produced by the methods and apparatus of the present invention will enable the production of lens systems exhibiting lower absorption levels within lens systems used in photolithographic equipment. Lower absorption will reduce lens heating effects, which impacts image performance and loss of contrast in photolithographic systems.

Additional advantages of the invention will be set forth in the following detailed description. It is to be understood that both the foregoing general description and the following detailed description are exemplary and are intended to provide further explanation of the invention as claimed.

DETAILED DESCRIPTION

The present invention relates to methods and apparatus for producing fused silica, and more particularly fused silica boules. The fused silica can be high purity fused silica, or it may contain one or more dopants if desired. In accordance with the invention, higher purity fused silica having internal transmission of at least 99.65%/cm and preferably greater than or equal to 99.75%/cm at 193 nm can be produced using the methods and apparatus described herein.

Figure 1:
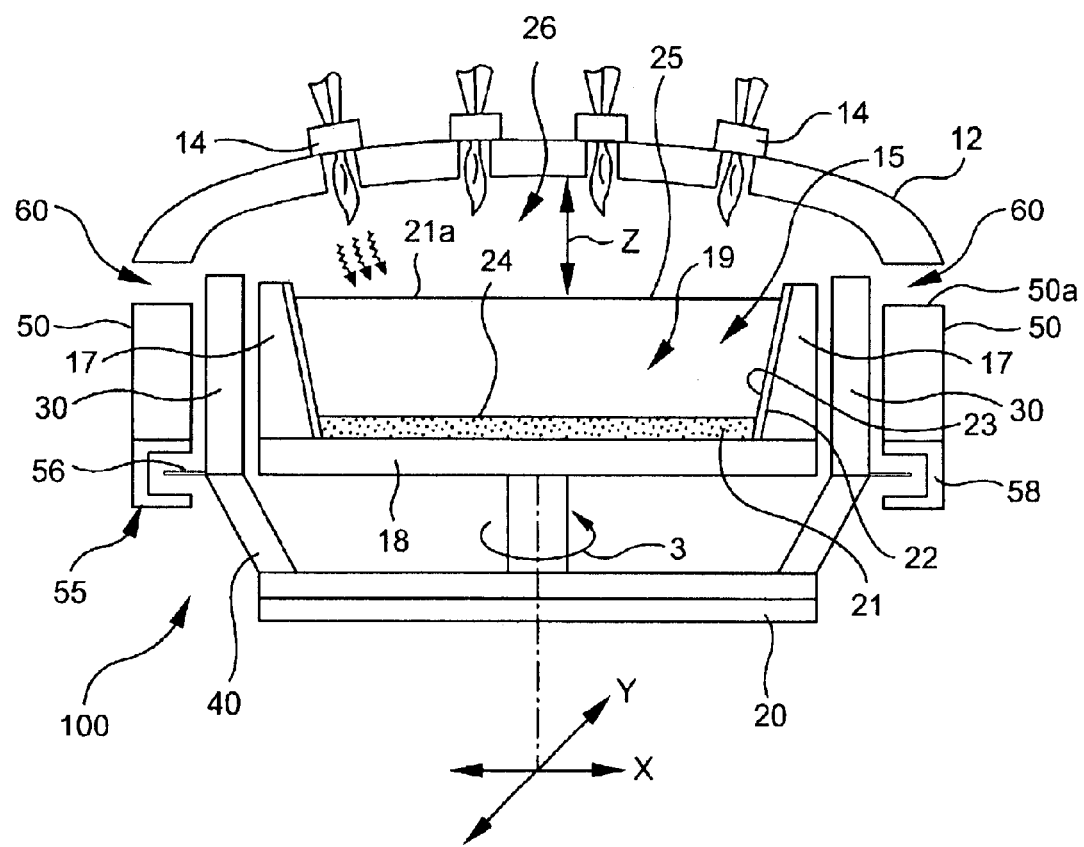
FIG. 1 is a schematic drawing illustrating a prior art furnace.
Figure 2:
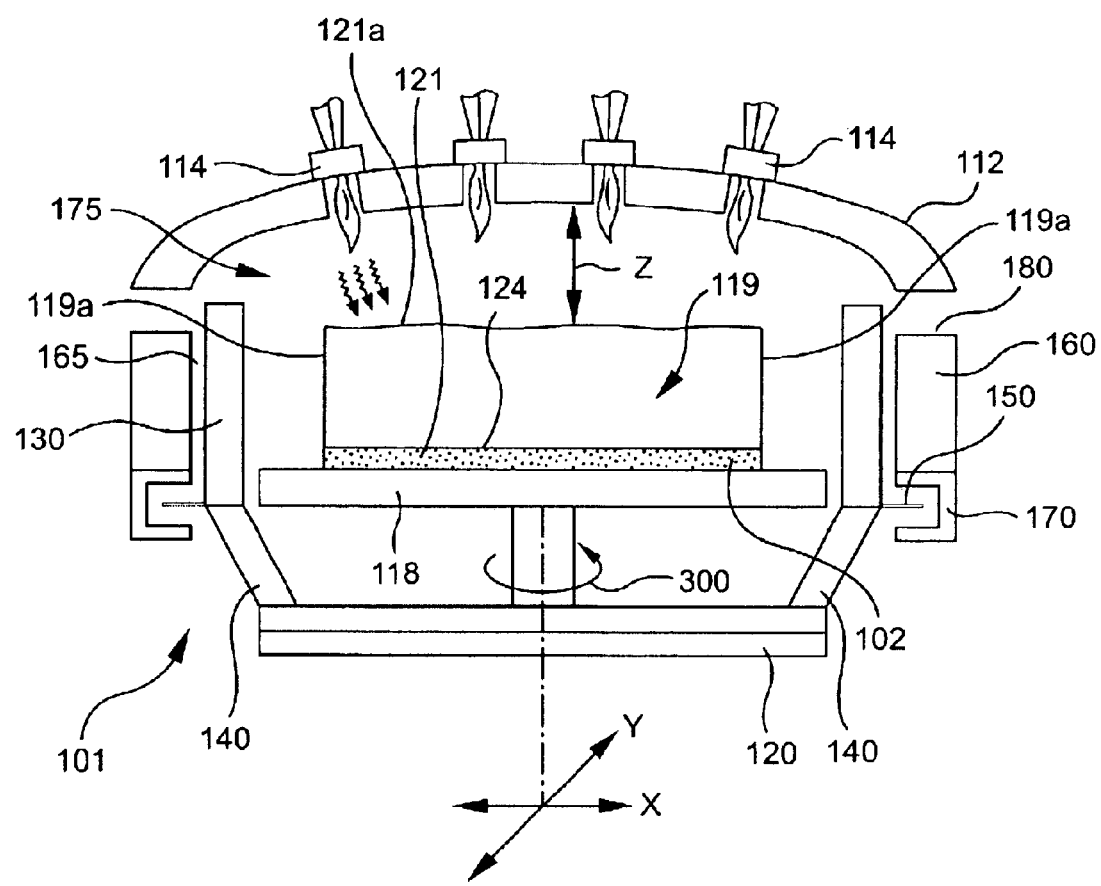
FIG. 2 is a schematic drawing illustrating a furnace according to one embodiment of the present invention.

In accordance with one aspect of the invention, fused silica having improved internal transmission can be produced by providing a furnace as shown in FIG. 2. FIG. 2 shows a furnace 101 constructed in accordance with the present invention. As in the furnace of FIG. 1, furnace 101 includes a base 118 having bait material 102 thereon which provides a collection surface 121 to collect soot particles produced by burners 114. The collection surface may also comprise bait material 102 with a fused silica plate having a thickness of approximately one inch disposed over the bait material (not shown). As opposed to the prior art furnace shown in FIG. 1, the furnace of the present invention does not include lateral walls to provide a containment vessel. Instead, the base 118 rotates about axis 300 as boule 119 is formed and also oscillates through its attachment to x-y oscillation table 120. Preferred patterns for the motion of the x-y oscillation table 120, which can be used in the practice of the present invention, are described in commonly assigned U.S. Pat. No. 5,696,038, entitled, "Boule Oscillation Patterns of Producing Fused Silica Glass," the entire contents of which are incorporated herein by reference. During deposition and consolidation of the soot particles, a boule 119 having sidewalls 119a and an upper major surface, which provides a collection surface 121 after the bait material is covered with soot particles.

Applicants have discovered that significant benefits are gained by removing as much refractory from the hot zone of the furnace as possible. In particular, removal of the lateral walls of the refractory cup and formation of the boule on a table lacking lateral walls prevents a prime contamination source from being in direct contact with the glass at high temperatures and reduces the working temperatures of the remaining refractories in the furnace 101.

The boule 119 is surrounded by shadow wall or air flow wall 130. Air flow wall 130 is mounted on x-y oscillation table 120 by means of feet 140, e.g., by four feet equally spaced around the circumference of the air flow wall. Other means of mounting the air flow wall to the oscillation table can be used if desired. In general, the mounting means should include spaces for the ingress of air to a space 175 between the sidewalls 119a of the boule 119.

Surrounding air flow wall 130 is stationary wall 160 which supports crown 112. A motion accommodating seal is formed between the stationary wall and the air flow wall. As shown in FIG. 2, this seal comprises an annular plate 150 which rides in (slides in) an annular channel 170 within stationary wall 160. Annular channel 170 can comprise a C-shaped annular metal plate which forms the bottom of the stationary wall. Other forms of motion accommodating seals can be used if desired, including flexible seals composed of flexible metal or refractory cloth which, for example, can be in the form of a bellows.

The products of combustion of the furnace 101 are exhausted through ports 180 circumferentially spaced around the furnace. Contrasted with the prior art furnace shown in FIG. 1, in which the ports 60 are located above the collection surface 21 and 21a during formation of the boule, in the furnace of the present invention shown in FIG. 2, the exhaust ports 180 are positioned at the same level or below the deposition surface 121 or 121a. Applicants have discovered that positioning of the ports 180 at or below the deposition surface 121 and 121a provides better temperature uniformity across the surface of the boule and more streamlined and less turbulent deposition conditions.

In use, the furnace 101 generates fused silica particles using procedures known in the art. Details on the operation and configuration of the burners 114 may be found in commonly assigned PCT patent application number WO 00/17115, the entire contents of which are incorporated herein by reference. Details on a preferred burner configuration and operation may be found in copending and commonly assigned United States patent application entitled, "High Heat Capacity Burners for Producing Fused Silica Boules," naming Thomas A. Collins, Chunhong C. He, Christine Heckel, Raymond E. Lindner and Michael H. Wasilewski as inventors, the entire contents of which are incorporated herein by reference.

Fused silica particles are generated by the burners and deposited on collection surface 121 on the base 118. As a boule 119a is formed by the collection and consolidation of fused silica particles, the boule upper major surface 121a become the collection surface. According to one aspect of the invention, the distance z between the burners and the collection surface 121 or 121a is maintained at an essentially constant distance during formation of the boule 119. Therefore, as the size and thickness of the boule 119 increases during the manufacturing process, the base 118 supporting the boule is moved away from the burners 114 to maintain an essentially constant distance between the collection surface 121a and the burners 114.

According to another aspect of the invention, applicants have discovered that by maintaining the temperature of the refractories used to construct the shadow wall 130, the crown 112 and the ring wall 160 below the temperature of the collection surface 121 and 121a, metals contamination of the fused silica boule is substantially reduced. The temperature of these surrounding refractories should be maintained at least 300° C. below the temperature of collection surface 121 and 121a. It is desirable to keep the temperature of the surrounding refractories, particularly the crown refractories, below 1550° C., and more preferably below 1450° C. Lower refractory temperatures of the surrounding refractories are believed to slow down the volatilization of metals in the refractories and diffusional processes which cause glass contamination. It is also believed that lower refractory temperatures can also minimize the zircon dissociation which occurs at the normal glass deposition temperatures. Contamination of the fused silica boule can be further minimized by calcining the refractory materials as described in commonly assigned U.S. Pat. No. 6,174,509, the entire contents of which are incorporated herein by reference.

Applicants have also discovered that removing the lateral walls of the refractory cup in the prior art standard furnace shown in FIG. 1 and providing a generally planar collection surface in accordance with the present invention, provides more flexibility to control the distance between the collection surface 121 and 121a and the burners. According to this setup, it is possible to run a true constant gap process. Applicants have discovered that it is desirable to maintain a distance z between the burners and the collection surface 121 of 7–9 inches over the course of laydown of the silica particles. By adjusting the burner flows to properly compensate for the additional heat loss caused by the missing lateral walls, the collection surface 121a on the upper major surface of the glass can be held in a position that maintains the proper furnace temperature to achieve consolidation of the fused silica particles. It has also been demonstrated that this arrangement has the potential for reducing the potential axial gradients in several glass properties and for having a positive impact on process stability and robustness. Another advantage of providing a collection surface that lacks lateral sidewalls and providing a constant gap arrangement between the burners and the collection surface is that thicker boules can be produced.

According to another aspect of the invention, the exhaust ports 180 are positioned such that the ports 180 are located at or below the collection surface 121 and 121a. It is believed that this arrangement minimizes the effects of the eddy currents observed in the standard, prior art furnace configuration. Moving the ports 180 below the collections surface will draw the burner flows across the boule 119 and down its sidewalls 119a. Mixing with air will occur away from the deposition zone where it will help to cool and stabilize the sides of the boule. This change should also improve uniformity of the furnace atmosphere over the boule. These effects can be further enhanced by increasing the number of side exhaust ports.

According to the present invention, fused silica optical members having improved transmission and low absolute maximum birefringence along the use axis are provided by the apparatus and methods of the invention. The fused silica optical members can be made by the fused silica boule process. In a typical fused silica boule process, a process gas such as nitrogen, is used as a carrier gas and a bypass stream of the nitrogen is introduced to prevent saturation of the vaporous stream. The vaporous reactant is passed through a distribution mechanism to the reaction site where a number of burners are present in close proximity to a furnace crown. The reactant is combined with a fuel/oxygen mixture at the burners and combusted and oxidized at a temperature greater than 1700° C. The high purity metal oxide soot and resulting heat is directed downward through the refractory furnace crown where it is immediately deposited and consolidated to a mass of glass on a hot bait contained on the table.

In one particularly useful embodiment of the invention, an optical member is formed by:
 a) producing a gas stream containing a silicon-containing compound in vapor form capable of being converted through thermal decomposition with oxidation or flame hydrolysis to silica;
 b) passing the gas stream into the flame of a combustion burner to form amorphous particles of fused silica;
 c) depositing the amorphous particles onto a support; and
 d) consolidating the deposit of amorphous particles into a transparent glass body.

Useful silicon-containing compounds for forming the glass blank preferably include any halide-flee cyclosiloxane compound, for example, polymethylsiloxane such as hexamethyldisiloxane, polymethylcyclosiloxane, and mixtures of these. Examples of particularly useful polymethylcyclosiloxane include octamethylcyclotetrasiloxane, decamethylcyclopentasiloxane, hexamethylcyclotrisiloxane, and mixtures of these.

In one particularly useful method of the invention, halide-free, cyclosiloxane compound such as octamethylcyclotetrasiloxane (OMCTS), represented by the chemical formula

is used as the feedstock for the fused silica boule process, or in the vapor deposition processes such as used in making high purity fused silica for optical waveguide applications.

As practiced commercially, boules having diameters on the order of five feet (1.5 meters) and thicknesses on the order of 5–10 inches (13–25 cm) can be produced using furnaces of the type shown in FIG. 1. According to the present invention, however, it is possible to produce boules having a thickness up to twenty inches thick. In brief overview, furnace 10 includes crown 12 carrying a plurality of burners 14 which produce silica soot which is collected to form boule 19, which as noted above, are typically on the order of five feet in diameter.

Applicants have also discovered that by adjusting the burner flows in the boule manufacturing furnace so that the hydrogen concentration of the finished boule is lowered to less than $3.0\times10^{17}$ molecues/cm$^3$ as measured by Raman spectroscopy results in a blank having a higher transmission and lower birefringence than conventional boules. According to the conventional process, burner flows were generally maintained so that the hydrogen concentration in the boule was as high as $5\times10^{17}$ molecules/cm$^3$. In another aspect of the invention, applicants have discovered that by further lowering the metals impurities contained in the zircon refractories in a standard boule production furnace, internal transmission of fused silica members manufactured from such boules is improved. Commonly assigned U.S. Pat. No. 6,174,509, the entire contents of which are incorporated herein by reference, describes a process for removing metals total metals impurities from zircon refractory brick to a level below 300 parts per million (ppm). Applicants have discovered that by utilizing the process described in U.S. Pat. No. 6,174,509 to calcine the refractories used in the boule furnace for a longer period of time to lower impurities in the refractory material, internal transmission of the fused silica is improved. It is preferred that the impurities in the refractories are lowered so that sodium is less than 2 ppm, calcium is less than 2 ppm and iron is less than 5 ppm. The time and conditions of each treatment will vary depending on the level of impurities in the as-received refractory materials and can be determined by experimentation. Lowering of the metals impurities in the refractories, along with lowering the temperature of the refractory surfaces of the furnace to at least 300° C. below the temperature of the deposition surface is believed to minimize volatilization of metals in the refractories and contamination of the boule.

Measurement of internal transmission was performed as follows. In unexposed fused silica, the internal transmittance is determined using a suitable UV spectrophotometer (e.g., Hitachi U4001) on optically polished samples. The internal transmittance (Ti) is determined by the measured transmission through the sample, divided by the theoretical transmission of such a sample as determined by surface reflections and then normalized to a 10 mm path length. The transmission of fused silica members produced in accordance with the present invention exhibited internal transmission exceeding 99.65%/cm at 193 nm.

Without intending to limit the invention in any manner, the present invention will be more fully described by the following example.

EXAMPLE

Preparation of High Transmission, Low Birefringent Fused Silica

A furnace as shown in FIG. 2 was used to produce fused silica in accordance with the present invention. Table II lists the transmission properties measured on samples produced in the modified furnace. Transmission was measured at radial locations 7, 9, 14, 21, 23 and 25 inches from the center of the boule, and in each case internal transmission exceeded 99.70% at 193 nm. Each of the measurements exceeded 99.74%/cm, and considering error in the measurement, this indicates that the fused silica can be produced according to the present invention exceeding 99.75%/cm. The minimum value for each sample is reported in Table I. Preliminary observations indicate that the birefringence values of these samples are expected to less 0.5 nm/cm along the use axis.

TABLE I

|  | Transmission %/cm | AIG (ppm/mm) |
| --- | --- | --- |
| Sample 1 (11–111) | 99.75 | 0.068 |
| Sample 2 (11–108) | 99.76 | 0.101 |
| Sample 3 (11–103) | 99.74 | 0.041 |

Applicants have determined that fused silica having the above properties can be consistently produced in production quantities. Fused silica produced using a standard production process typically exhibits a transmission of up to 99.6%/cm. Considering the fact that the theoretical transmission of fused silica is 99.85%/cm, the internal transmission values achieved by using the modified furnace according to this example represent a marked improvement over the standard process.

Figure 3:
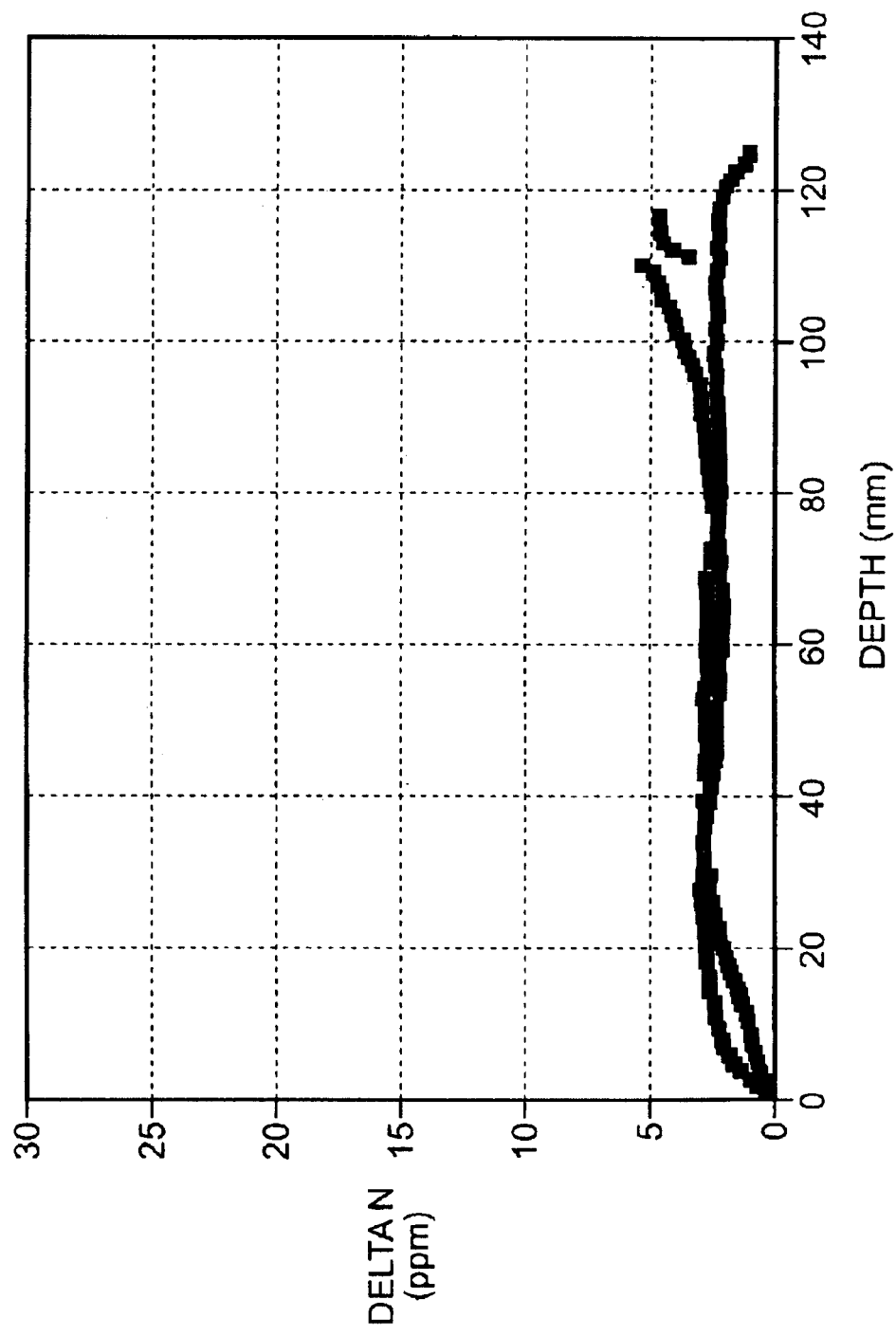
FIG. 3 is a graph showing the refractive index homogeneity of fused silica produced according to the present invention in a direction essentially perpendicular to the use axis as a function of depth.

The axial index gradient (AIG) was also measured for the samples, and the values were equal to 0.101 ppm/mm or below. The AIG measures the gradient in refractive index in a direction substantially perpendicular to the direction of the use axis of the fused silica. Axial Index Gradient (AIG), represented as the slope of the linear fit in units of ppm/mm of the refractive index variation within an optical member, is measured using commercial phase measuring interferom eters with a laser operating at 632.8 nm. Boule witness samples are thermally stabilized and are either polished or made transparent by utilizing index matching oil. Techniques known to those skilled in the art are used to analyze the TILT component of standard homogeneity measurements to determine the linear fit slope of the refractive index variation. The measurements exclude the TILT component caused by the test setup/equipment. FIG. 3 shows a graph of the index homogeneity in fused silica samples in a direction substantially perpendicular to the use axis of the samples. The graph shows that fused silica produced using the furnace of the present invention can have an index gradient less than 3 ppm to a depth of 100 mm and an AIG less than 0.03 ppm/mm. The values shown in Table II and in FIG. 3 represent a significant improvement in axial index gradient and index homogeneity over fused silica produced in a standard furnace.

It will be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

What is claimed is:

1. A furnace for manufacturing fused silica boules comprising:
    a plurality of burners for depositing fused silica particles;
    a generally planar collection surface disposed below the burners for collecting the fused silica particles and supporting a boule having an upper major surface and sidewalls during the deposition process, the collection surface lacking lateral walls; and
    refractories surrounding the fused silica boule, and wherein the furnace further includes means for maintaining the temperature of the refractories at least 300° C. cooler than the temperature of the collection surface.

2. The furnace of claim 1, wherein the furnace further includes means for maintaining a constant distance between the burners and the upper major surface of the boule during formation of the boule.

3. The furnace of claim 1, wherein the refractories surface includes zircon.

4. The furnace of claim 3, wherein the furnace has a crown region, and wherein the refractories in the crown region include zircon.

* * * * *